US011305606B2

(12) United States Patent
Dawkes

(10) Patent No.: US 11,305,606 B2
(45) Date of Patent: Apr. 19, 2022

(54) ANTI-ROLL BAR FOR A VEHICLE

(71) Applicant: Ningbo Geely Automobile Research & Development Co., Ltd., Ningbo (CN)

(72) Inventor: Andrew Dawkes, Spekeröd (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/140,695

(22) Filed: Jan. 4, 2021

(65) Prior Publication Data

US 2021/0122208 A1  Apr. 29, 2021

Related U.S. Application Data

(63) Continuation of application No. PCT/CN2019/091976, filed on Jun. 20, 2019.

(30) Foreign Application Priority Data

Jul. 12, 2018  (EP) .................................... 18183157

(51) Int. Cl.
*B60G 21/055*  (2006.01)
*B60G 17/016*  (2006.01)

(52) U.S. Cl.
CPC ..... *B60G 21/0558* (2013.01); *B60G 17/0162* (2013.01); *B60G 21/0556* (2013.01);
(Continued)

(58) Field of Classification Search
CPC ............ B60G 21/0558; B60G 17/0162; B60G 21/0556; B60G 2202/412;
(Continued)

(56) References Cited

U.S. PATENT DOCUMENTS

2006/0049601 A1* 3/2006 Matsumoto ........ B60G 17/0162
                                                         280/124.106
2006/0273539 A1* 12/2006 Barth ................. B60G 21/0558
                                                         280/124.107

FOREIGN PATENT DOCUMENTS

CN  101890890 A  11/2010
CN  103625238 A   3/2014
(Continued)

OTHER PUBLICATIONS

Barth, Suspension System for a Vehicle Having a Decouplable Stabiliser Bar, Mar. 7, 2007, EPO, EP 1759895 A1, Machine Translation of Description (Year: 2007).*

(Continued)

*Primary Examiner* — Paul N Dickson
*Assistant Examiner* — Matthew D Lee
(74) *Attorney, Agent, or Firm* — Tucker Ellis LLP

(57) ABSTRACT

An anti-roll bar for a vehicle. The anti-roll bar includes a first bar portion for connection to a left-side wheel suspension of the vehicle and a second bar portion for connection to a right-side wheel suspension of the vehicle, and an actuator unit connecting the first bar portion and the second bar portion to each other for transferring torque between the first bar portion and the second bar portion. The actuator unit has a first selectable mode providing a first predetermined torque ratio between the first bar portion and the second bar portion, and a second selectable mode providing a second predetermined torque ratio between the first bar portion and the second bar portion. The first torque ratio and the second torque ratio are different from each other.

18 Claims, 3 Drawing Sheets

(52) U.S. Cl.
CPC .. *B60G 2202/412* (2013.01); *B60G 2202/413* (2013.01); *B60G 2202/44* (2013.01); *B60G 2204/4191* (2013.01); *B60G 2204/421* (2013.01); *B60G 2400/204* (2013.01); *B60G 2400/41* (2013.01)

(58) Field of Classification Search
CPC .......... B60G 2202/413; B60G 2202/44; B60G 2204/4191; B60G 2204/421; B60G 2400/204; B60G 2400/41; B60G 2202/13; B60G 2206/427
See application file for complete search history.

(56) References Cited

FOREIGN PATENT DOCUMENTS

| CN | 106627026 | A |   | 5/2017 | |
|----|-----------|---|---|--------|--|
| CN | 106945480 | A |   | 7/2017 | |
| CN | 107433833 | A | * | 12/2017 | |
| CN | 108146183 | A | * | 6/2018 | |
| CN | 207842585 | U | * | 9/2018 | |
| DE | 10164481 | A1 | * | 7/2002 | ......... B60G 21/0556 |
| DE | 10164481 | A1 |   | 7/2002 | |
| DE | 102004004335 | A1 |   | 8/2005 | |
| DE | 102004034100 | A1 |   | 2/2006 | |
| EP | 1759895 | A1 | * | 3/2007 | ......... B60G 17/0162 |
| EP | 1759895 | A1 |   | 3/2007 | |
| FR | 3044265 | A1 |   | 6/2017 | |
| WO | WO-2007091667 | A1 | * | 8/2007 | ......... B60G 17/0164 |

OTHER PUBLICATIONS

Faye, Transverse Stabilization System for Road Vehicle, Decouples Stabilizer in Accordance With Nature of Road Ahead, Which is Registered in Memory With Aid of Global Positioning System, Jul. 4, 2007, EPO, DE 10164481 A1, Machine Translation of Description (Year: 2007).*

International Search Report from corresponding International Application No. PCT/CN2019/091976, dated Sep. 20, 2019, 2 pages.

* cited by examiner

ANTI-ROLL BAR FOR A VEHICLE

RELATED APPLICATION DATA

This application is a continuation of International Patent Application No. PCT/CN2019/091976, filed Jun. 20, 2019, which claims the benefit of European Patent Application No. 18183157.9, filed Jul. 12, 2018, the disclosures of which are incorporated herein by reference in their entireties.

TECHNICAL FIELD

The invention relates to an anti-roll bar for a vehicle. The anti-roll bar comprises a first bar portion for connection to a left-side wheel suspension of the vehicle and a second bar portion for connection to a right-side wheel suspension of the vehicle, and an actuator unit connecting the first bar portion and the second bar portion for transferring torque between the first bar portion and the second bar portion.

BACKGROUND

An anti-roll bar (ARB) for a vehicle connects the left-side wheel suspension and the right-side wheel suspension to each other. The ARB helps to reduce the body roll of the vehicle during cornering. A vehicle equipped with a stiff ARB will roll less than a vehicle equipped with a soft ARB. A stiff ARB is however not optimal when driving in a straight line and one wheel goes over a bump, since this wheel will tend to lift the other wheel. This in turn will impair the ride comfort. Further, the off-road performance of the vehicle is improved if an independent wheel suspension is possible.

Different solutions of a so-called split ARB are used for enabling a softer ARB and a possibility to disconnect the ARB. Such systems using a motor for providing torque between two halves of the ARB for changing the effective stiffness of the ARB are however reactive. In other words; the motor has to quickly generate a relatively high torque required during a cornering maneuver, for instance.

SUMMARY

An objective of the invention is to provide an anti-roll bar for a vehicle enabling the effective stiffness of the ARB and thereby the roll stiffness for a wheel suspension of the vehicle to be changed with less energy input.

The objective is achieved by an anti-roll bar for a vehicle, wherein the anti-roll bar comprises a first bar portion for connection to a left-side wheel suspension of the vehicle and a second bar portion for connection to a right-side wheel suspension of the vehicle, and an actuator unit that connects the first bar portion and the second bar portion to each other for transferring torque between the first bar portion and the second bar portion, and wherein the actuator unit has a first selectable mode providing a first predetermined torque ratio between the first bar portion and the second bar portion, and a second selectable mode providing a second predetermined torque ratio between the first bar portion and the second bar portion, and the first predetermined torque ratio and the second predetermined torque ratio are different from each other. Thus, load on the wheel suspension can be transferred by the actuator unit from the first bar portion to the second bar portion, i.e. from the left-side wheel suspension to the right-side wheel suspension, and vice versa.

The invention is based on the insight that by such an anti-roll bar, the effective stiffness of the ARB can be adjusted to the current conditions. Thus, the desired effective stiffness can be adjusted before or during a cornering manoeuvre for instance. There is no need of a motor for providing a high torque changing the stiffness of the ARB during the cornering manoeuvre. It should be stressed that by the expression "effective stiffness", is meant the behaviour of the ARB, i.e. the tendency that a movement of a left-side wheel will have an impact on the movement of a right-side wheel and vice versa. The rotational stiffness or rotational inertia of the individual bar portions is however not changed.

As mentioned, the actuator unit and thereby the ARB has two or more selectable modes. One such selectable mode can be used as a default value. Further, suitably a selectable mode giving a relatively high effective stiffness of the ARB is used during turning and cornering, while a selectable mode giving a softer ARB is used when driving on a bumpy road or for improving off-road performance.

For example, a dimension (diameter) of the bar portions can be adapted to provide highest effective stiffness required and the invention can be used for decreasing the effective stiffness of the ARB when required. In another embodiment, the invention can be used for increasing the effective stiffness of the ARB.

According to one embodiment of the anti-roll bar, the actuator unit provides a first lever arm for the first bar portion and a second lever arm for the second bar portion, the first lever arm and the second lever arm being connected for transferring torque between the first bar portion and the second bar portion, the ratio between the length of the first lever arm and the length of the second lever arm is adjustable for achieving the first selectable mode and the second selectable mode.

Adjustment of the ratio between the first lever arm length and the second lever arm length can be performed by levers having adjustable effective lengths or gears for which the gear ratio can be shifted.

According to a further embodiment, the actuator has at least one first lever connected to one of the first bar portion and the second bar portion, the effective length of the first lever being variable for achieving the adjustable ratio between the length of the first lever arm and the length of the second lever arm, and preferably the actuator unit has a first lever connected to the first bar portion and a second lever connected to the second bar portion, wherein the effective length of the first lever and the effective length of the second lever are variable for achieving the adjustable ratio between the length of the first lever arm and the length of the second lever arm. Hereby, the effective stiffness of the ARB can be adjustable in a robust and non-complicated way.

According to a further embodiment, the actuator unit comprises a controllable actuator member for adjusting the ratio between the length of the first lever arm and the length of the second lever arm. Hereby, the adjustment of the anti-roll bar can be performed automatically by means of a control unit controlling the actuator member for achieving the desired ratio between the lever arms. Preferably, the actuator member is a hydraulic or pneumatic cylinder.

According to a further embodiment, the actuator unit comprises gear wheels for transferring torque between a first shaft of the actuator unit connected to the first bar portion and a second shaft of the actuator unit connected to the second bar portion, the gear ratio between the first shaft and the second shaft being changeable for achieving the first selectable mode and the second selectable mode. Hereby, a space-saving solution can be achieved.

According to a further embodiment, the actuator unit comprises at least one planetary gear train providing the gear wheels, and preferably the actuator unit comprises a first planetary gear train and a second planetary gear train, and each of the first planetary gear train and the second planetary gear train has an input shaft and an output shaft, where the input shaft of the first planetary gear train constitutes said first shaft and the input shaft of the second planetary gear train constitutes said second shaft, and the output shaft of the first planetary gear train and the output shaft of the second planetary gear train are connected to each other. Hereby, the effective stiffness of the ARB in case of a movement of the left-side wheel can be varied by means of the first planetary gear train, and the effective stiffness of the ARB in case of a movement of the right-side wheel can be varied by means of the second planetary gear train.

Preferably, the first planetary gear train and the second planetary gear train have similar design and are connected in series and mirror-inverted relative to each other. When the first planetary gear train is used the second planetary gear train is by-passed and vice versa. The actuator unit can comprise one or more clutches for changing the gear ratio between the first shaft and the second shaft.

According to another aspect of the invention, a further objective is to provide a control unit for controlling an anti-roll bar of a vehicle.

This object is achieved by control unit for controlling an anti-roll bar of a vehicle, wherein the anti-roll bar comprises a first bar portion for connection to a left-side wheel suspension of the vehicle and a second bar portion for connection to a right-side wheel suspension of the vehicle, and an actuator unit connecting the first bar portion and the second bar portion to each other for transferring torque between the first bar portion and the second bar portion, and wherein the actuator unit has a first selectable mode providing a first predetermined torque ratio between the first bar portion and the second bar portion, and a second selectable mode providing a second predetermined torque ratio between the first bar portion and the second bar portion, where the first predetermined torque ratio and the second predetermined torque ratio are different from each other, and wherein the control unit is configured to receive input signals representing information about the vehicle and/or occupant of the vehicle and based on the input signals control the actuator unit for selectively activating the first selectable mode or the second selectable mode.

According to one embodiment of the control unit, the control unit is configured to receive the input signals representing information about position and/or dynamic data of the vehicle. Hereby, the requisite effective stiffness of the ARB can be adapted to driving conditions.

According to one embodiment of the control unit, the control unit is configured to receive the input signals from a GPS and/or an electronic map. Hereby, the requisite effective stiffness of the ARB can be adapted to road conditions.

According to a further embodiment, the control unit is configured to receive the input signals representing information about the speed, driving direction, steering angle and/or weight of the vehicle. Hereby, the requisite effective stiffness of the ARB can be adapted to driving conditions.

According to a further embodiment, the control unit is configured to receive the input signals representing information about an upcoming turning or cornering manoeuvre of the vehicle and in advance of the current manoeuvre select the first selectable mode or the second selectable mode. Hereby, the effective stiffness of the ARB can be adapted to a forthcoming traffic situation.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
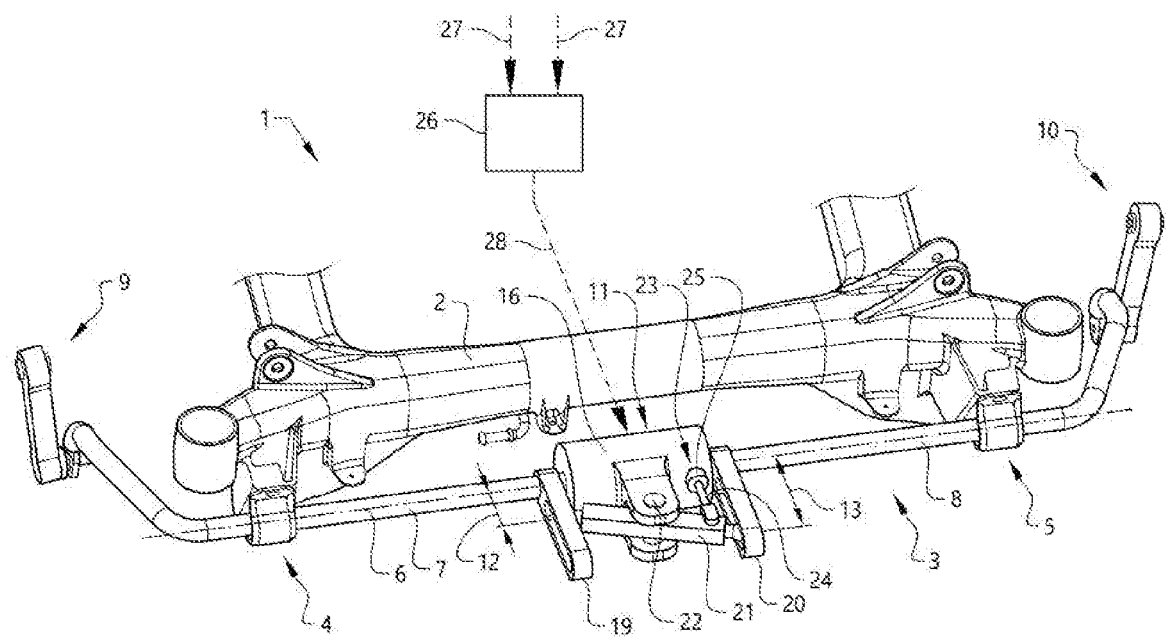
FIG. 1 is a perspective view of a part of a vehicle chassis having a frame portion with an anti-roll bar.

FIG. 1 shows a part of a chassis 1 of a vehicle in a perspective view. The chassis 1 has a frame portion 2 and an anti-roll bar (ARB) 3 arranged on the frame portion 2. The ARB is suitably attached to the frame portion 2 at a first position 4 on a left-hand side and at a second position 5 on the right-hand side. The ARB 3 is journaled relative to the frame portion 2 at the first and second attachment positions 4,5, thereby allowing the ARB to pivot about a centre line 6 of the ARB relative to the frame portion 2. The ARB is used in a wheel suspension system of the vehicle. The ARB 3 connects a left-side wheel suspension with a right-hand wheel suspension of the vehicle. The anti-roll bar 3 comprises a first bar portion 7 for connection to the left-side wheel suspension (not shown) and a second bar portion 8 for connection to the right-side wheel suspension (not shown). The first bar portion 7 has a first connection point 9 connectable to the left-side wheel suspension at a first end of the ARB 3 and the second bar portion 8 has a second connection point 10 connectable to the right-side wheel suspension at a second opposite end of the ARB 3.

The ARB further comprises an actuator unit 11 connecting the first bar portion 7 and the second bar portion 8 to each other for transferring torque between the first bar portion 7 and the second bar portion 8. The actuator unit 11 has a first selectable mode providing a first predetermined torque ratio between the first bar portion 7 and the second bar portion 8, and a second selectable mode providing a second predetermined torque ratio between the first bar portion 7 and the second bar portion 8. The first predetermined torque ratio and the second predetermined torque ratio are different from each other. Due to the different torque ratios of the first and second selectable modes, the effective stiffness of the ARB 3 can be adjusted. Of course, the actuator unit 11 may provide two or more selectable modes providing different predetermined torque ratios and thereby various effective stiffness of the ARB 3.

In the example embodiment illustrated in FIG. 1, the actuator unit 11 provides a first lever arm 12 for the first bar portion 7 and a second lever arm 13 for the second bar portion 8. The first lever arm 12 and the second lever arm 13 are connected for transferring torque between the first bar portion 7 and the second bar portion 8. The ratio between the length of the first lever arm 12 and the length of the second lever arm 13 is adjustable for achieving the first selectable mode and the second selectable mode. By lever arm is meant the perpendicular distance 12, 13 from the centre line 6 of the current bar portion 7, 8 to a point where a torque transferred by the bar portion results in a force which force acts on the lever arm 13, 12 of the other bar portion 8, 7.

Figure 2:
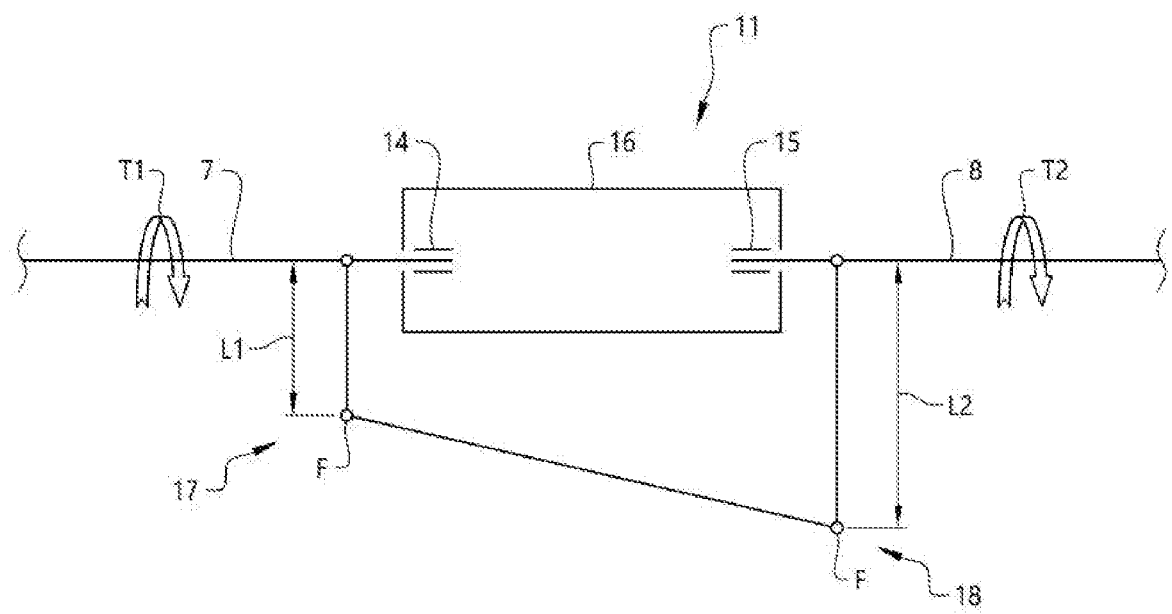
FIG. 2 is a schematic view of the anti-roll bar in FIG. 1.

In the schematic view shown in FIG. 2, the torques T1, T2 and forces F are illustrated. The first bar portion 7 is journaled at a first end of the actuator unit 11. The second bar portion 8 is journaled at a second opposite end of the actuator unit 11. For example, the first bar portion 7 and the second bar portion 8 can be journaled by bearings 14, 15 in a housing 16 of the actuator unit 11. The housing 16 can be cylinder-shaped for instance. The housing 16 is not necessarily rigidly fixed to the vehicle, but can be free to rotate relative to the vehicle.

The first lever arm is denoted L1 (reference numeral 12 in FIG. 1) and the second lever arm is denoted L2 (reference numeral 13 in FIG. 1). The outer end 17 of the first lever arm L1 and the outer end 18 of the second lever arm L2 are connected to each other. A torque T1 transferred by the first bar portion 7 will create a force F (directed perpendicular to the paper in FIG. 2). The force F will act on the second lever arm L2 and create a torque T2 transferred by the second bar portion 8.

The lever arms 12, 13 can be achieved in many ways. One example embodiment is illustrated in FIG. 1, where the actuator unit 11 has a first lever 19 connected to the first bar portion 7 and a second lever 20 connected to the second bar portion 8. The effective length of the first lever 19 and the effective length of the second lever 20 are variable for achieving the adjustable ratio between the length of the first lever arm 12 and the length of the second lever arm 13. A rod 21 arranged on the housing 16 connects the first lever 19 and the second lever 20. The rod 21 is pivotally attached to the housing 16 such that when being pivoted the effective length of the levers 19, 20 are changed. This can be achieved by making the rod 21 pivotable about a centre point 22 of the rod 21 and slidingly connecting the ends of the rod 21 to the respective lever 19, 20. Thus, when the first lever arm 12 is decreased, the second lever arm 13 is increased, and vice versa. Each lever is suitably designed to allow the rod end sliding along a curve since the rod pivots about the centre position 22. This can be performed by making the lever curve-shaped or with a width sufficient to allow such a movement of the rod.

Further, the actuator unit 11 may comprise a controllable actuator member 23 for adjusting the ratio between the length of the first lever arm 12 and the length of the second lever arm 13. The actuator member 23 can be for example a hydraulic or pneumatic cylinder with a piston rod 24 or a stepping motor with gear wheel and a pinion rack. In FIG. 1, a piston rod 24 of an actuator cylinder 25 is connected to one end of the rod 21 which rod connects the first lever 19 and the second lever 20. The actuator cylinder 25 can be arranged inside the housing 16 of the actuator unit 11.

In FIG. 1 a control unit 26 for controlling the anti-roll bar 3 is also schematically illustrated. The actuator unit 11 is controllable by the control unit 26 of the vehicle for activating the first selectable mode and the second selectable mode. The control unit 26 is arranged to communicate with the actuator unit 11. The control unit 26 can be configured to receive input signals 27 representing information about the vehicle and/or occupant of the vehicle, and suitably the position and/or dynamic data of the vehicle, and based on the input signals control the actuator unit 11 for selectively activating the first selectable mode or the second selectable mode. For example, the control unit 26 can transmit output signals 28 to the actuator cylinder 25 for adjustment of the lever arms 12, 13.

Preferably, the control unit 26 is configured to receive the input signals 27 from a GPS and/or an electronic map. The control unit 26 can also be configured to receive the input signals 27 representing information about one or more of the following vehicle parameters: speed, driving direction, steering angle and weight of the vehicle. For example, the control unit 26 can be configured to receive the input signals 27 representing information about an upcoming turning or cornering manoeuvre of the vehicle and in advance of the current manoeuvre select the first selectable mode or the second selectable mode. Of course, also other information of the vehicle behaviour and/or the driving style of the driver can be transmitted to the control unit and be used for deciding on which selectable mode should be used.

The control unit 26 may comprise one or more microprocessors and/or one or more memory devices or any other components for executing a computer program to perform the adjustment of the actuator unit 11 and thereby the ARB 3. The control unit 26 is preferably provided with a computer program for performing the control functions described hereinabove. The control unit can be a separate component or be integrated in another controller of the ARB or the vehicle. The control unit can be used for controlling other parameters of the vehicle as well. The control unit can be part of a controller used also for other functions of the vehicle.

Figure 3:
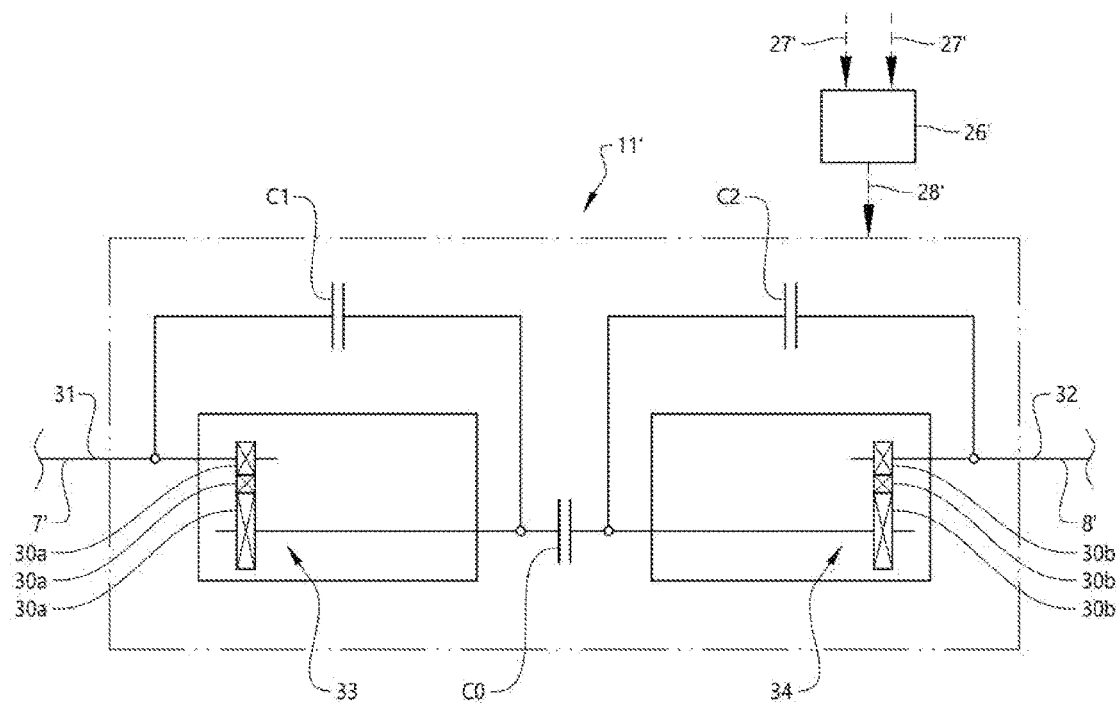
FIG. 3 is a schematic view of an actuator unit for an anti-roll bar.

FIG. 3 shows a schematic view of a further example embodiment of an actuator unit 11'. The actuator unit 11' comprises gear wheels 30a, 30b for transferring torque between a first shaft 31 of the actuator unit 11' connected to the first bar portion 7' and a second shaft 32 of the actuator unit 11' connected to the second bar portion 8'. The gear ratio between the first shaft 31 and the second shaft 32 is changeable for achieving the first selectable mode and the second selectable mode. The actuator unit 11' illustrated in FIG. 3 has a first gear mechanism 33 and a first clutch C1 for achieving two gear ratios. The first gear mechanism 33 can be used for achieving a first gear ratio between the first shaft 31 and the second shaft 32 corresponding to the first selectable mode. Although in another example embodiment one or more gear ratios could be achieved by the first gear mechanism, a second gear ratio between the first shaft 31 and the second shaft 32 corresponding to the second selectable mode is here achieved by the first clutch C1. When the first clutch C1 is open, the gear ratio is determined by the gear wheels 30a of the first gear mechanism 33 and when the first clutch C1 is closed, the gear ratio is 1:1.

Further, the actuator unit 11' comprises a second gear mechanism 34 designed in the same way as the first gear mechanism 33. When a second clutch C2 is open, the gear ratio is determined by the gear wheels 30b of the second gear mechanism 34 and when the second clutch C2 is closed, the gear ratio is 1:1.

The first and second gear mechanisms 33, 34 are suitably arranged mirror-inverted for giving the same effect in both directions. Hence, the effect on the right-side wheel due to the movement of the left-side wheel will depend on whether the first gear mechanism 33 or the first clutch C1 is activated, whereas the effect on the left-side wheel due to the movement of the right-side wheel will depend on whether the second gear mechanism 34 or the second clutch C2 is activated. When the first gear mechanism 33 or the first clutch C1 is activated, the second clutch C2 and an intermediate clutch C0 are closed. When the second gear mechanism 34 or the second clutch C2 is activated, the first clutch C1 and the intermediate clutch C0 are closed.

The first and second gear mechanisms 33, 34 may comprise two or more gear wheels 30a, 30b. In the example embodiment illustrated in FIG. 3, each gear mechanism 33, 34 has three gear wheels for achieving the requisite gear ratio and maintaining the same rotation direction of the second shaft 32 as the first shaft 31 when movement is initiated on the left-side wheel, and for maintaining the same rotation direction of the first shaft 31 as the second shaft 32 when movement is initiated on the right-side wheel.

The intermediate clutch C0 is usually closed, but in case the ARB should be fully disconnected by separating the first bar portion 7' and the second bar portion 8' from each other, the intermediate clutch C0 can be opened. Thereby, the actuator unit 11' has a further selectable mode where the first bar portion 7' and the second bar portion 8' are disconnected from each other for preventing any torque to be transferred between the first bar portion 7' and the second bar portion 8'. As previously described with reference to FIG. 1, the actuator unit 11' can be controlled by a control unit 26' receiving input signals 27' and providing output signals 28' to the actuator unit 11'.

Figure 4:
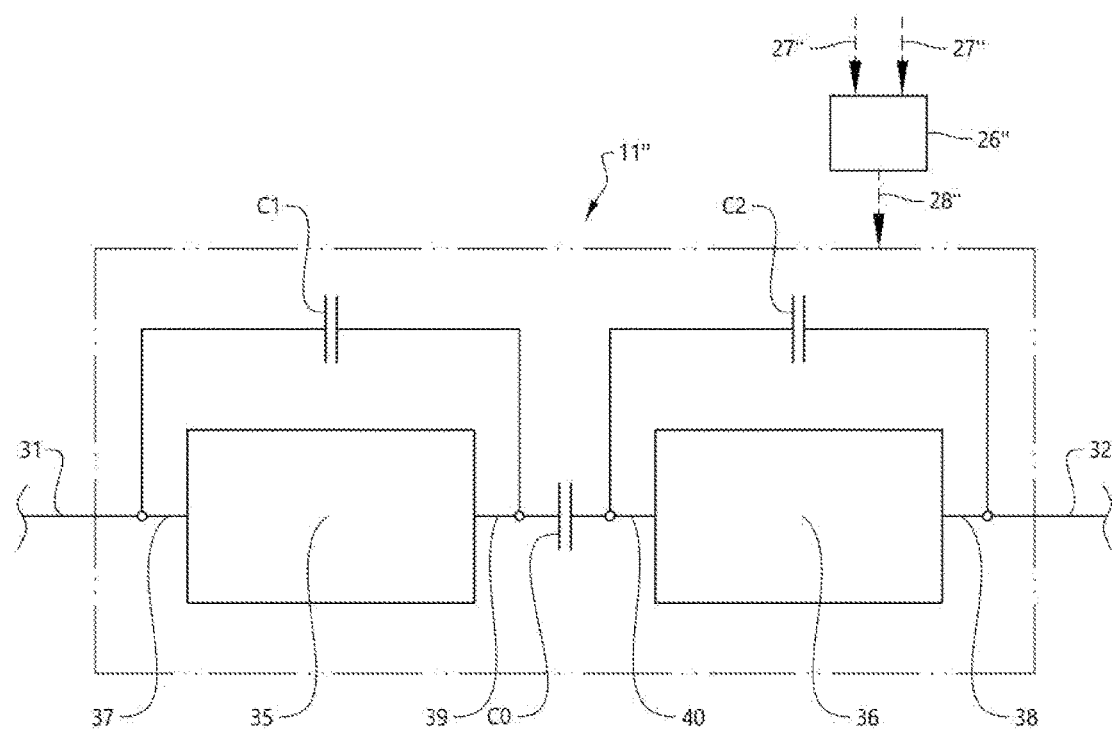
FIG. 4 is a schematic view of a further actuator unit for an anti-roll bar.

FIG. 4 shows a schematic view of a further example embodiment of an actuator unit 11". The actuator unit 11" comprises a first gear mechanism 35 and a second gear mechanism 36 as previously described with reference to FIG. 3. In this example embodiment each gear mechanism 35, 36 is constituted by a planetary gear train. Thus, the actuator unit 11" comprises a first planetary gear train and a second planetary gear train. Each of the first planetary gear train and the second planetary gear train has an input shaft 37, 38 and an output shaft 39, 40. The input shaft 37 of the first planetary gear train constitutes said first shaft 31 and the input shaft 38 of the second planetary gear train constitutes said second shaft 32. The output shaft 39 of the first planetary gear train and the output shaft 40 of the second planetary gear train are connected to each other.

The first planetary gear train and the second planetary gear train have suitably similar design and are connected in series and mirror-inverted relative to each other. As previously described with reference to FIG. 3, the actuator unit 11" suitably comprises one or more clutches C1, C2, C0 for changing the gear ratio between the first shaft 31 and the second shaft 32. Although the clutches are illustrated as separated from the gear mechanisms 35, 36, one or more clutches can also be integrated in the gear mechanisms.

Figure 5:
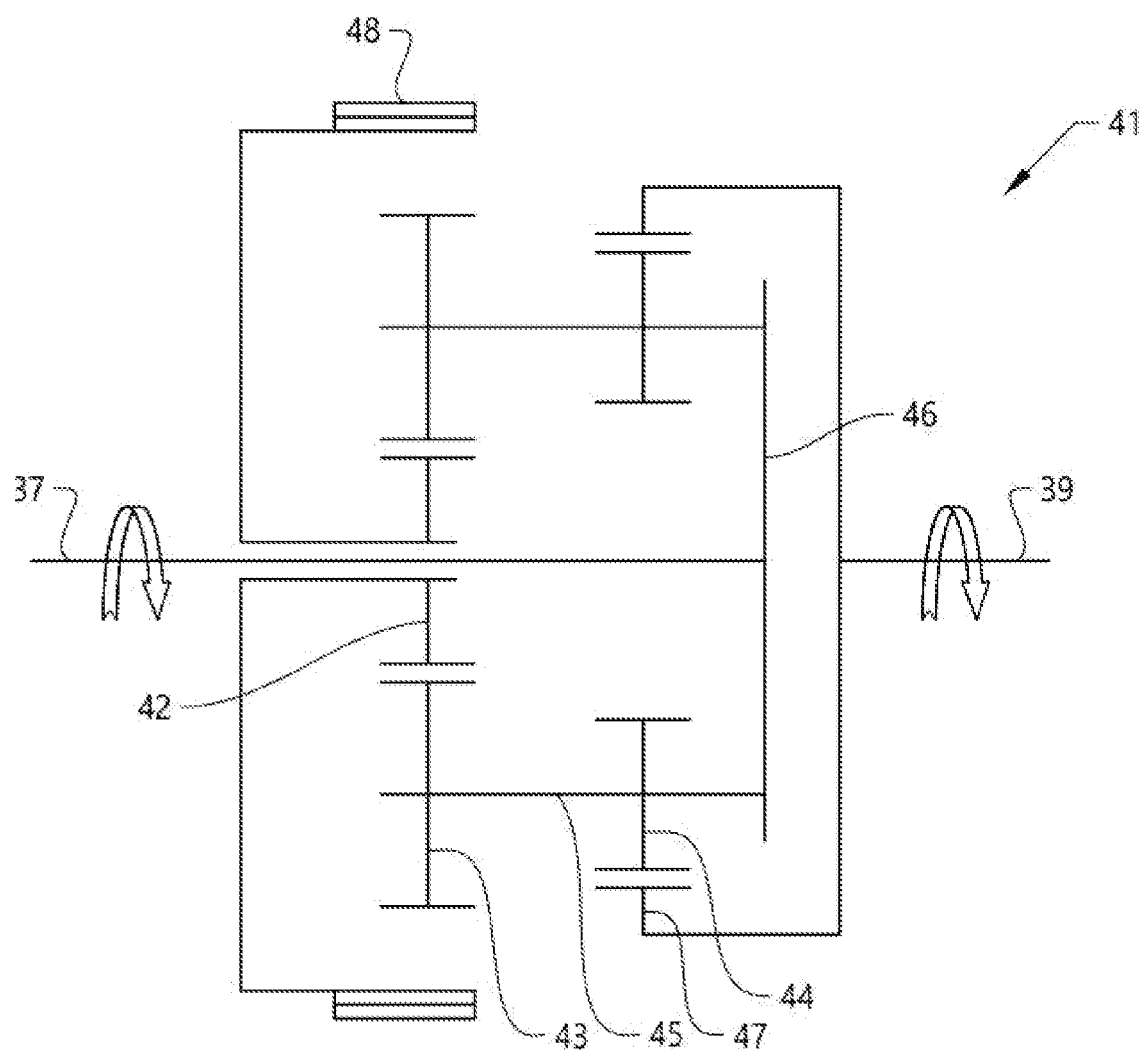
FIG. 5 is a schematic view of a gear mechanism of the actuator unit in FIG. 4.

FIG. 5 shows an example of the first gear mechanism 35 in FIG. 4. The gear mechanism 35 has a planetary gear train 41 with an input shaft 37, a sun wheel 42 arranged concentrically relative to the input shaft 37 and engaged with a number of large planet wheels 43, and small planet wheels 44. One large planet wheel 43 and one small planet wheel 44 are arranged on each planet carrier pin 45 attached to a planet carrier 46. The planet carrier 46 is integral with the input shaft 37. The small planet wheels 44 are engaged with an internally toothed ring gear 47. An output shaft 39 is integral to the ring gear 47. The gear ratio of the planetary gear train can be selected by holding either the sun wheel 42 stationary by a clutch 48 or holding the ring gear 47 and the planet carrier 46 stationary relative to each other by a further clutch (not shown).

It is to be understood that the present invention is not limited to the embodiments described above and illustrated in the drawings; rather, the skilled person will recognize that many changes and modifications may be made within the scope of the appended claims.

What is claimed is:

1. An anti-roll bar for a vehicle, the anti-roll bar comprising:
    a first bar portion for connection to a left-side wheel suspension of the vehicle and a second bar portion for connection to a right-side wheel suspension of the vehicle, and
    an actuator unit connecting the first bar portion and the second bar portion to each other for transferring torque between the first bar portion and the second bar portion,
    wherein the actuator unit has a first selectable mode providing a first predetermined torque ratio between the first bar portion and the second bar portion, and a second selectable mode providing a second predetermined torque ratio between the first bar portion and the second bar portion, the first predetermined torque ratio and the second predetermined torque ratio being different from each other; and
    wherein the actuator unit provides a first lever arm for the first bar portion and a second lever arm for the second bar portion, the first lever arm and the second lever arm being connected for transferring torque between the first bar portion and the second bar portion, the ratio between the length of the first lever arm and the length of the second lever arm is adjustable for achieving the first selectable mode and the second selectable mode.

2. The anti-roll bar according to claim 1, wherein the actuator unit has at least one first lever connected to one of the first bar portion and the second bar portion, the effective length of the first lever being variable for achieving the adjustable ratio between the length of the first lever arm and the length of the second lever arm.

3. The anti-roll bar according to claim 1, wherein the actuator unit has a first lever connected to the first bar portion and a second lever connected to the second bar portion, the effective length of the first lever and the effective length of the second lever being variable for achieving the adjustable ratio between the length of the first lever arm and the length of the second lever arm.

4. The anti-roll bar according to claim 1, wherein the actuator unit comprises a controllable actuator member for adjusting the ratio between the length of the first lever arm and the length of the second lever arm.

5. The anti-roll bar according to claim 4, wherein the actuator member is an actuator cylinder with a piston rod.

6. An anti-roll bar for a vehicle, the anti-roll bar comprising:
    a first bar portion for connection to a left-side wheel suspension of the vehicle and a second bar portion for connection to a right-side wheel suspension of the vehicle, and
    an actuator unit connecting the first bar portion and the second bar portion to each other for transferring torque between the first bar portion and the second bar portion,
    wherein the actuator unit has a first selectable mode providing a first predetermined torque ratio between the first bar portion and the second bar portion, and a second selectable mode providing a second predetermined torque ratio between the first bar portion and the second bar portion, the first predetermined torque ratio and the second predetermined torque ratio being different from each other; and
    wherein the actuator unit comprises gear wheels for transferring torque between a first shaft of the actuator unit connected to the first bar portion and a second shaft of the actuator unit connected to the second bar portion, the gear ratio between the first shaft and the second shaft being changeable for achieving the first selectable mode and the second selectable mode.

7. The anti-roll bar according to claim 1, wherein the actuator unit is controllable by a control unit of the vehicle for activating the first selectable mode and the second selectable mode.

8. The anti-roll bar according to claim 6, wherein the actuator unit comprises one or more clutches for changing the gear ratio between the first shaft and the second shaft.

9. The anti-roll bar according to claim 6, wherein the actuator unit comprises at least one planetary gear train providing the gear wheels.

10. The anti-roll bar according to claim 6, wherein the actuator unit comprises a first planetary gear train and a second planetary gear train, each of the first planetary gear train and the second planetary gear train having an input shaft and an output shaft, an input shaft of the first planetary gear train constituting said first shaft and an input shaft of the second planetary gear train constituting said second shaft, an output shaft of the first planetary gear train and an output shaft of the second planetary gear train being connected to each other.

11. The anti-roll bar according to claim 10, wherein the first planetary gear train and the second planetary gear train have the same design and are connected in series and mirror-inverted relative to each other.

12. The anti-roll bar according to claim 1, wherein the actuator unit has a further selectable mode where the first bar portion and the second bar portion are disconnected from each other for preventing any torque to be transferred between the first bar portion and the second bar portion.

13. A control unit for controlling an anti-roll bar of a vehicle, the anti-roll bar comprising a first bar portion for connection to a left-side wheel suspension of the vehicle and a second bar portion for connection to a right-side wheel suspension of the vehicle, and an actuator unit connecting the first bar portion and the second bar portion to each other for transferring torque between the first bar portion and the second bar portion, the actuator unit having a first selectable mode providing a first predetermined torque ratio between the first bar portion and the second bar portion, and a second selectable mode providing a second predetermined torque ratio between the first bar portion and the second bar portion, the first predetermined torque ratio and the second predetermined torque ratio being different from each other, and wherein the actuator unit provides a first lever arm for the first bar portion and a second lever arm for the second bar portion, the first lever arm and the second lever arm being connected for transferring torque between the first bar portion and the second bar portion, the ratio between the length of the first lever arm and the length of the second lever arm is adjustable for achieving the first selectable mode and the second selectable mode, wherein the control unit is configured to receive input signals representing information about at least one of the vehicle or an occupant of the vehicle and, based on the input signals, control the actuator unit for selectively activating the first selectable mode or the second selectable mode.

14. The control unit according to claim 13, wherein the control unit is configured to receive the input signals representing information about the position and/or dynamic data of the vehicle.

15. The control unit according to claim 13, wherein the control unit is configured to receive the input signals from a GPS and/or an electronic map.

16. The control unit according to claim 13, wherein the control unit is configured to receive the input signals representing information about the speed, driving direction, steering angle and/or weight of the vehicle.

17. The control unit according to claim 13, wherein the control unit is configured to receive the input signals representing information about an upcoming turning or cornering manoeuvre of the vehicle and in advance of the current manoeuvre select the first selectable mode or the second selectable mode.

18. A control unit for controlling an anti-roll bar of a vehicle, the anti-roll bar comprising a first bar portion for connection to a left-side wheel suspension of the vehicle and a second bar portion for connection to a right-side wheel suspension of the vehicle, and an actuator unit connecting the first bar portion and the second bar portion to each other for transferring torque between the first bar portion and the second bar portion, the actuator unit having a first selectable mode providing a first predetermined torque ratio between the first bar portion and the second bar portion, and a second selectable mode providing a second predetermined torque ratio between the first bar portion and the second bar portion, the first predetermined torque ratio and the second predetermined torque ratio being different from each other, and wherein the actuator unit comprises gear wheels for transferring torque between a first shaft of the actuator unit connected to the first bar portion and a second shaft of the actuator unit connected to the second bar portion, the gear ratio between the first shaft and the second shaft being changeable for achieving the first selectable mode and the second selectable mode, wherein the control unit is configured to receive input signals representing information about at least one of the vehicle or an occupant of the vehicle and, based on the input signals, control the actuator unit for selectively activating the first selectable mode or the second selectable mode.

* * * * *